United States Patent Office 3,422,541
Patented Jan. 21, 1969

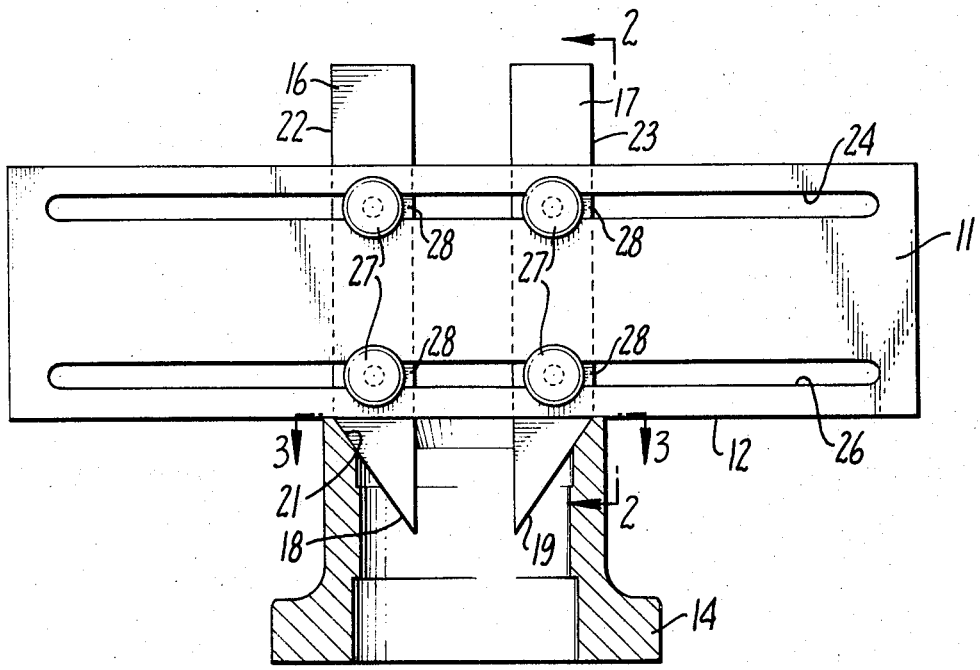
FIG. 1.
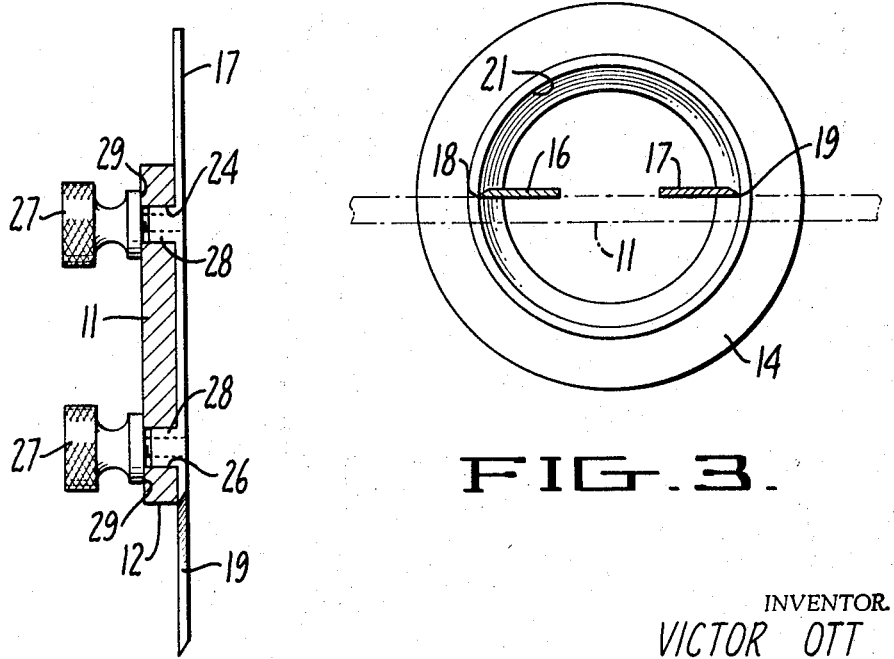
FIG. 2.
FIG. 3.

3,422,541
MEASURING INSTRUMENT
Victor Ott, 555 Eddy St., San Francisco, Calif. 94109
Filed Oct. 25, 1967, Ser. No. 678,055
U.S. Cl. 33—158                        11 Claims
Int. Cl. G01b 5/08; G01b 3/38

ABSTRACT OF THE DISCLOSURE

An instrument for measuring the diameter of the theoretical line of intersection between the flat end face of a die and a conical chamfer formed thereat. A pair of feelers are carried for sliding movement toward and away from each other on a slotted bar and each feeler has an inclined edge extending past a straight reference edge of the bar and inclined the same amount in an opposite direction to the inclined edge of the other feeler. Each feeler has a measurement face perpendicular to the reference edge and intersecting the inclined edge at the plane of the reference edge so that the distance between the measurement faces will accurately reflect the diameter of the apexes.

Background of the invention

This invention relates to measuring instruments, and more particularly to instruments for measuring apexes in circular dies.

When making metal forming dies having circular openings or depressions, or circular peripheries, a beveled or chamfered portion is often required adjacent to the flat die face. Dimensions for the chamfered portions are usually specified by giving the angle of the chamfer from the axis of rotation and the diameter of the "apexes." In die makers parlance, the term diameter of the "apexes" in this context is used to mean the distance between the apexes of the angles formed by the generatrix of the conical bevel and the plane of the die face. This gives the diameter of the line of intersection between the plane of the die face and the conical chamfer. Since the metal at this line of intersection is often filleted, in most cases the diameter of the line of intersection (the "apexes"), cannot be measured directly with any accuracy. The present instrument is formed for making such measurements quickly and simply.

Prior art devices capable of providing a measurement of the apexes have been extremely complicated, have required a high degree of accuracy in their construction, and are difficult to manipulate in a manner providing a precise reading. An example of the prior art devices is found in U.S. Patent No. 3,116,560 to G. T. Matthews. The instrument of the present invention is simple and sturdy in construction, is easy to use and provides very accurate readings.

Summary of the invention

The measuring instrument of the present invention consists basically of a body having a pair of feelers mounted thereon for relative movement toward and away from each other, somewhat in the manner of an inside and outside calipers. One edge of the body is straight so it can be seated firmly against the flat die face. The feelers project outwardly past this straight edge and are provided with oppositely inclined edges at identical angles to the straight reference edge of the body. The feelers are also provided with flat measurement faces perpendicular to the reference edge and intersecting the inclined edges at the plane of the reference edge.

The feelers are formed with the inclined edges at the same angle of inclination as the angle of the generatrix of the conical chamfer to be measured so that the inclined edges will contact the chamfer in mating engagement along a line coincident with the generatrix of the chamfer. The feelers are removable and replaceable by similar feelers having their inclined edges at different angles for measuring the diameter of the apexes of correspondingly differently angled chamfers. The inclined edges of the feelers diverge as they progress away from the straight reference edge for measuring outside chamfers and converge as they progress away from the straight reference edge for measuring inside chamfers. The same feelers are used for measuring the diameter of the apexes of both inside and outside chamfers of similar taper by merely transposing the position of the feelers on the bar.

The operation of the instrument is very simple. A pair of feelers having their inclined edges at the same angle as the angle of the chamfer to be measured, are mounted on the body. The straight reference edge is placed in engagement with the flat face of the die and the inclined edges of the feelers are moved into the described mating contact with the chamfer at diametrically opposed locations. The distance between the flat measuring faces of the two feelers then exactly corresponds to the diameter of the apexes, and a measurement of this distance is obtained by the use of conventional measuring devices such as micrometers or vernier calipers.

Accordingly, it is a principal object of the present invention to provide a measuring instrument capable of measuring apexes in circular dies in a rapid and simple manner.

Another object of the present invention is to provide an instrument of the character described which is simple and sturdy in construction, contains a minimum number of movable parts and wear points, and which still provides a high degree of precision. A further object of the invention is to provide an instrument of the character set forth which may be easily and quickly adapted for use in measuring the apexes of inside and outside circular bevels and chamfers having various angles of inclination to the die face.

Further objects and advantages of the present invention will appear as the specification proceeds and in the claims attached hereto.

Brief description of the drawings

The preferred forms of the present invention are illustrated in the accompanying drawings, forming part of this application, in which:

FIGURE 1 is a side elevational view of a measuring instrument constructed in accordance with the present invention and shown in operative position on a circular die having an inside bevel, the die being shown in cross-section for clarity, FIGURE 2 is a vertical cross-sectional view taken substantially on the plane of line 2—2 of FIGURE 1, FIGURE 3 is a plane cross-sectional view taken substantially on the plane of line 3—3 of FIGURE 1.

Figure 4:
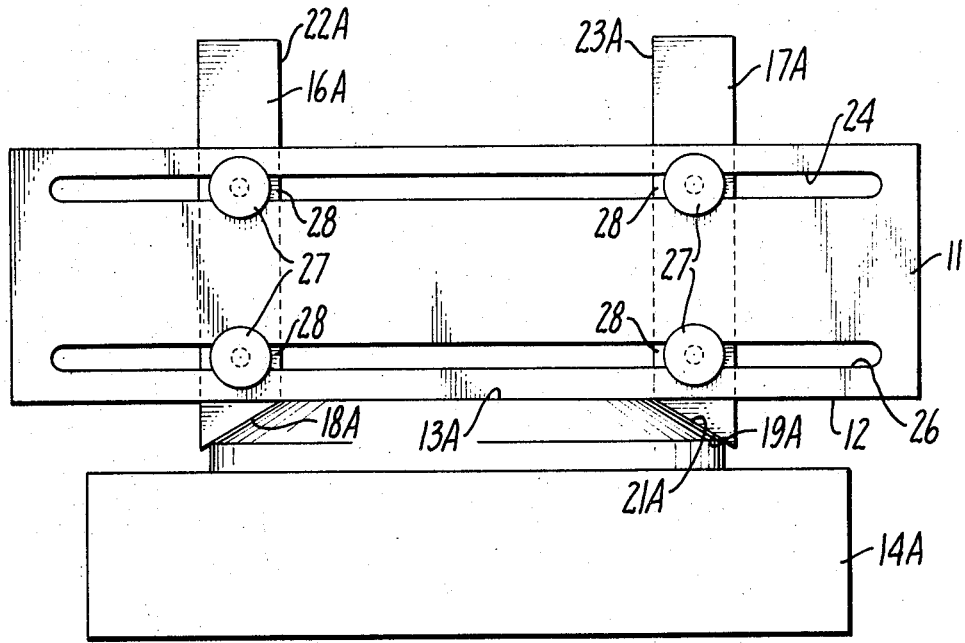
FIGURE 4 is a side elevational view of the measuring instrument of the present invention modified for use in measuring a different type and angle of bevel or chamfer, and is shown in operative position on a die having an outside bevel.

While only the preferred forms of the present invention are shown, it should be understood that various changes or modifications may be made within the scope of the claims attached hereto without departing from the spirit of the invention.

*Description of the preferred embodiments*

Referring to the drawings in detail, it will be seen that the measuring instrument of the present invention basically comprises a body 11 having a straight reference edge 12 adapted for engagement with the flat end face 13 of a circular die 14, and a pair of feelers 16 and 17 carried on the body 11 for relative movement toward and away from each other in a direction parallel to the reference edge 12, each of the feelers 16 and 17 having an inclined edge 18 and 19, respectively, projecting beyond the reference edge 12 for mating engagement with diametrically opposite portions of a chamfer 21 formed on the die adjacent to face 13, each of the feelers 16 and 17 being formed to provide a measurement face 22 and 23, respectively, perpendicular to the reference edge 12 and intersecting the inclined edges 18 and 19 at the plane of the reference edge 12 so that the distance between the measurement faces 22 and 23 will accurately define the diameter of the juncture line or intersection of the plane of the flat end face 13 with the conical plane of the chamfer 21.

As here shown, the body 11 is provided in the form of an elongated, flat metal bar, of which one edge defines straight reference edge 12, and the feelers 16 and 17 are slidably mounted in slots in the bar 11 parallel to the edge 12, in order to provide the described relative movement toward and away from each other. Preferably, improved resistance to cocking of the feelers 16 and 17 is provided by making the bar 11 relatively wide and forming two widely spaced slots 24 and 26. The feelers 16 and 17 are releasably secured for sliding movement along the slots 24 and 26 by thumbscrews 27 threadably engaged in rectangular bosses 28 on the feelers 16 and 17. The bosses 28 have a snug, sliding fit in the grooves 24 and 26 and tightening of the thumbscrews 27 securely clamps the bar 11 between the feelers 16 and 17 and confronting shoulders 29 on the thumbscrews 27.

As may best be seen in FIGURE 3 of the drawings, the inclined edges 18 and 19 of the feelers 16 and 17 are beveled or sharpened so as to provide a substantially line contact with the diametrically opposed areas of the bevel 21. This avoids inaccuracies which would appear if the edges 18 and 19 were of any appreciable width.

As a feature of the present invention, the measuring instrument can be used to measure different angles of bevel or chamfer, and may also be used to measure either inside or outside bevels or chamfers. In FIGURE 4 of the drawings, the instrument is illustrated set up for measuring an outside chamfer 21A on a circular die 14A. A pair of feelers 16A and 17A, similar to feelers 16 and 17, but having an identical angle of the inclined edges 18A and 19A different than inclined edges 18 and 19, are mounted on the bar 11 by use of the thumbscrews 27 engaged through the slots 24 and 26. The straight reference edge 12 is placed in engagement with the flat end face 13A of die 14A and the inclined edges 18A and 19A are moved into mating contact with the diametrically opposed portions of bevel 21A. The desired measurement is then obtained by measuring the distance between the measurement faces 22A and 23A in any suitable way. In this connection it should be noted that the feelers may be converted for inside or outside chamfers by merely transposing them, that is, by removing one feeler and mounting it on the bar on the opposite side of the other feeler.

Figures 5, 6:
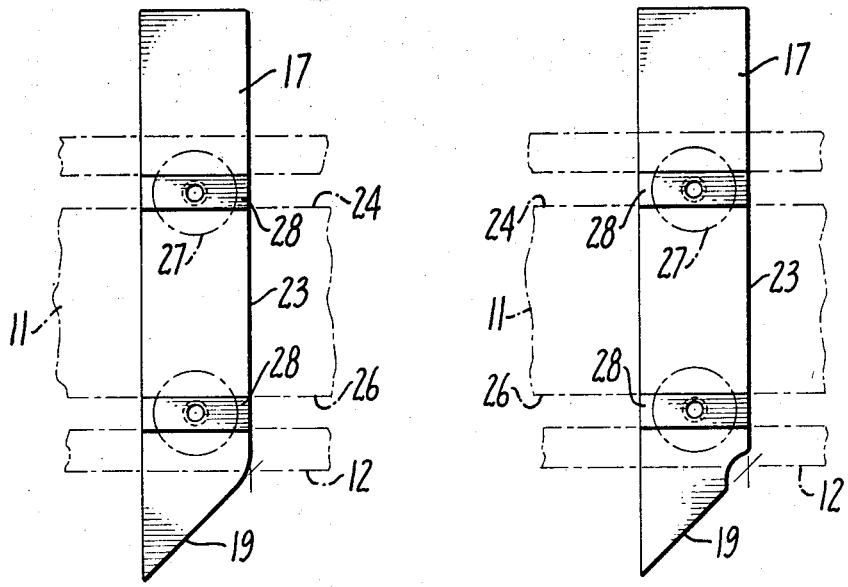
FIGURE 5 is a side elevational view of a modified form of a feeler forming part of the measuring instrument of FIGURE 4.
FIGURE 6 is a view similar to that of FIGURE 5 but illustrating a further modified form of feeler.

It often happens that the juncture between the chamfer or beveled portion of the die and the flat end face is filleted or otherwise formed in such manner that the feelers illustrated in FIGURES 1 and 4 of the drawings might interfere with such portions of the dies to give a false reading. The present invention avoids any such problem by cutting away or relieving portions of the feelers, such as feeler 17, at the intersection between the measuring face 23 and the inclined edge 19, in the manner shown in FIGURES 5 and 6 of the drawings. This relieving of the fingers in no way impairs their efficiency in indicating the distance between the theoretical apexes, so long as the inclined edges 19 can contact at least a portion of the chamfer in the described manner.

From the foregoing it will be seen that the measuring instrument of the present invention is particularly adapted for rapidly and efficiently measuring apexes in circular dies, with the instrument being adapted to measure the apexes of both inside and outside chamfers having different angles of inclination to the die face. The structure of the instrument is sturdy, contains a minimum number of moving parts and wear points, is easy to manufacture, and provides a high degree of precision.

I claim:

1. An instrument for measuring the diameter of the line of intersection between the flat end face and an adjacent conical chamfer of a die, comprising
    a body having a straight reference edge adapted for engagement with the flat end face of the die, and
    a pair of feelers carried on said body for relative movement toward and away from each other in a direction parallel to said reference edge,
    each of said feelers having an inclined edge projecting beyond said reference edge for mating engagement with diametrically opposite portions of a chamfer formed on the die adjacent to said end face,
    each of said feelers being formed to provide a measurement face perpendicular to said reference edge, the plane of said measurement face intersecting the plane of said inclined edge at the plane of said reference edge whereby the distance between said measurement faces will accurately reflect the diameter of the juncture line defined by the intersection of the plane of the flat end of the die with the conical plane of the chamfer.

2. An instrument as described in claim 1 and wherein said body is formed from an elongated bar.

3. An instrument as described in claim 1 and wherein said body is formed with a slot therethrough parallel to said straight reference edge, and said feelers are slideably mounted in said slot.

4. An instrument as described in claim 3 and wherein each of said feelers is elongated to project past both edges of said body.

5. An instrument as described in claim 4 and wherein said feelers are provided with elongated bosses having a sliding fit in said slot, and thumbscrews threadably engage said feelers through said slot for releasably securing said feelers at desired locations therealong.

6. An instrument as described in claim 5 and wherein a plurality of parallel slots are formed in said body parallel to said straight reference edge and a plurality of spaced thumbscrews are provided on each of said feelers for engagement through said slots to clamp said feelers to said body, each of said feelers being engaged with a plurality of said slots.

7. An instrument as described in claim 1 and wherein said feelers are interchangeable, with corresponding feelers having their inclined edges at different angles to their measurement faces for measuring chamfers of differing angles.

8. An instrument as described in claim 1 and wherein said inclined edges of said feelers are beveled to provide a sharp edge affording substantially line contact with the diametrically opposed portions of the chamfer.

9. An instrument as described in claim 1 and wherein said feelers are relieved at said intersection of their inclined edges with their measurement faces.

10. An instrument as described in claim 1 and wherein said inclined faces converge as they proceed from said reference edge for measuring the apexes of inside chamfers.

11. An instrument as described in claim 1 and wherein said inclined faces diverge as they proceed from said reference edge for measuring apexes of outside chamfers.

References Cited

UNITED STATES PATENTS

| | | | |
|---|---|---|---|
| 2,498,397 | 2/1950 | Daly | 33—143 |
| 2,758,383 | 8/1956 | Breit | 33—178 |
| 2,801,472 | 8/1957 | Davidiak et al. | 33—143 |
| 2,801,474 | 8/1957 | Field et al. | 33—178 |
| 3,016,618 | 1/1962 | Speed et al. | 33—143 |

SAMUEL S. MATTHEWS, *Primary Examiner.*

U.S. Cl. X.R.

33—178